July 22, 1969   W. BIPPUS ET AL   3,456,421
APPARATUS FOR THE MANUFACTURE OF EVACUATED FILM PACKAGES
Filed Feb. 17, 1966   3 Sheets-Sheet 1
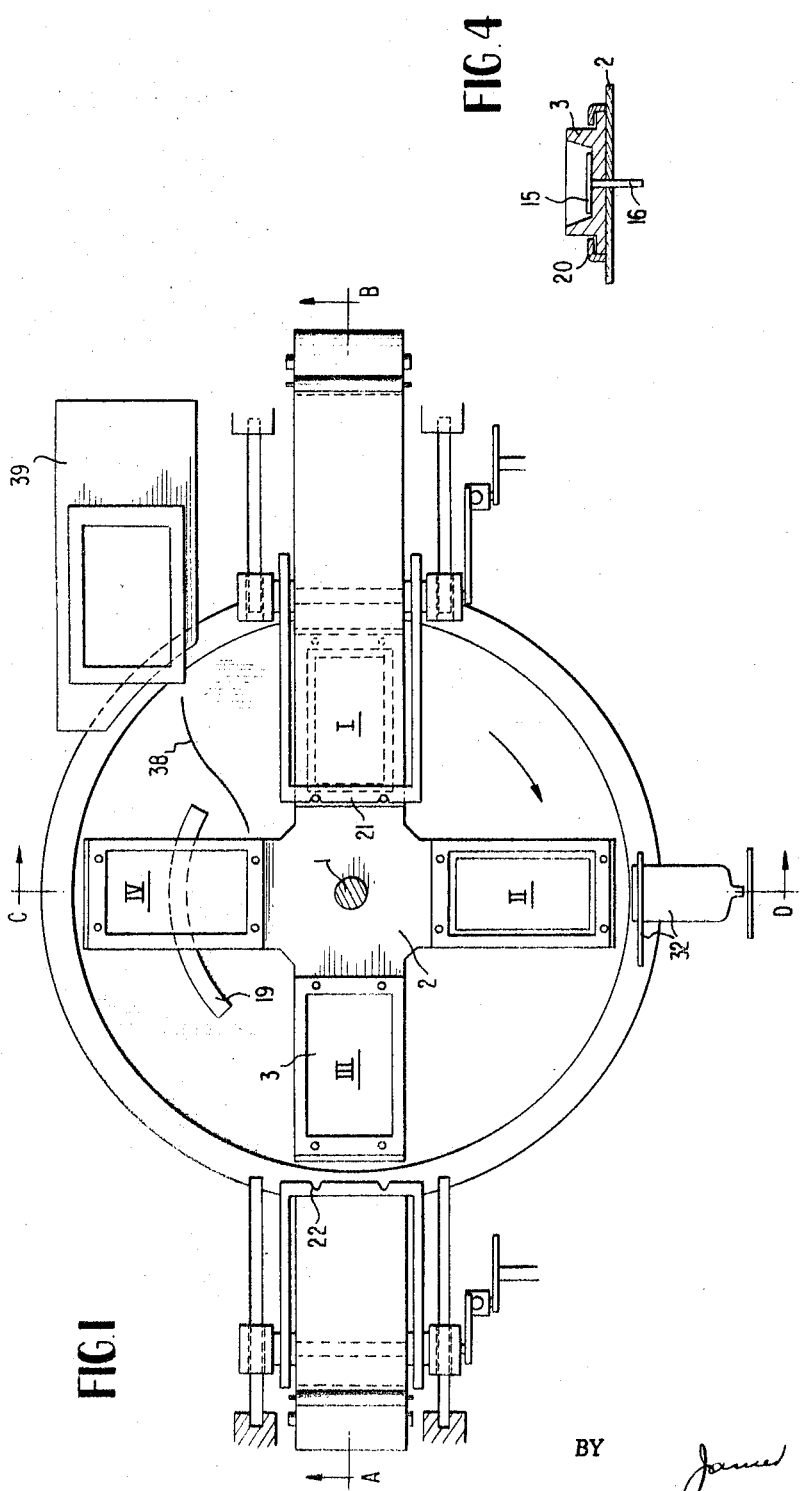
INVENTORS
WALTER BIPPUS
HORST ACKERMANN
GISBERT HÖRDLER
BY
ATTORNEY

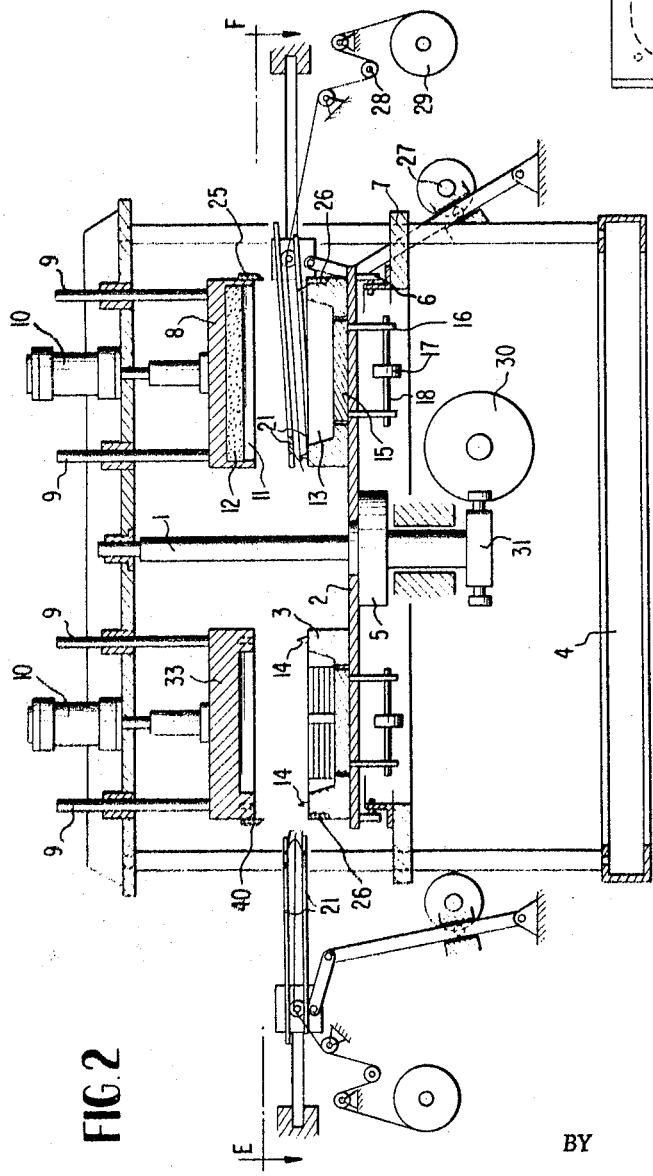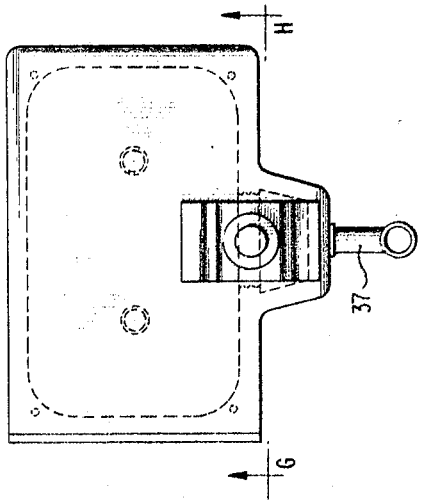

July 22, 1969   W. BIPPUS ET AL   3,456,421
APPARATUS FOR THE MANUFACTURE OF EVACUATED FILM PACKAGES
Filed Feb. 17, 1966   3 Sheets-Sheet 3

INVENTORS
WALTER BIPPUS
HORST ACKERMANN
GISBERT HÖRDLER

BY James E. Bryan
ATTORNEY

United States Patent Office 3,456,421
Patented July 22, 1969

3,456,421
APPARATUS FOR THE MANUFACTURE OF EVACUATED FILM PACKAGES
Walter Bippus, Wiesbaden-Biebrich, and Horst Ackermann and Gisbert Hördler, Wiesbaden, Germany, assignors to Kalle Aktiengesellschaft, Wiesbaden-Biebrich, Germany, a corporation of Germany
Filed Feb. 17, 1966, Ser. No. 528,272
Claims priority, application Germany, Feb. 20, 1965, K 55,347
Int. Cl. B65b
U.S. Cl. 53—112
9 Claims

ABSTRACT OF THE DISCLOSURE

This invention relates to an apparatus for preparing evacuated plastic packages which comprises a movable mold carrier; means for conducting a film over a mold at a first station of the carrier, the latter station including film-cutting means and means to form the film into a container in the mold; means for moving the container to a second station the latter including means for filling the container; means for moving the filled container to a third station the latter including means for conducting a film over the container, means for cutting the film, means for sealing the film to the container, and means for evacuating the package so formed; and means for removing a completely sealed package from the mold.

---

Figure 3:
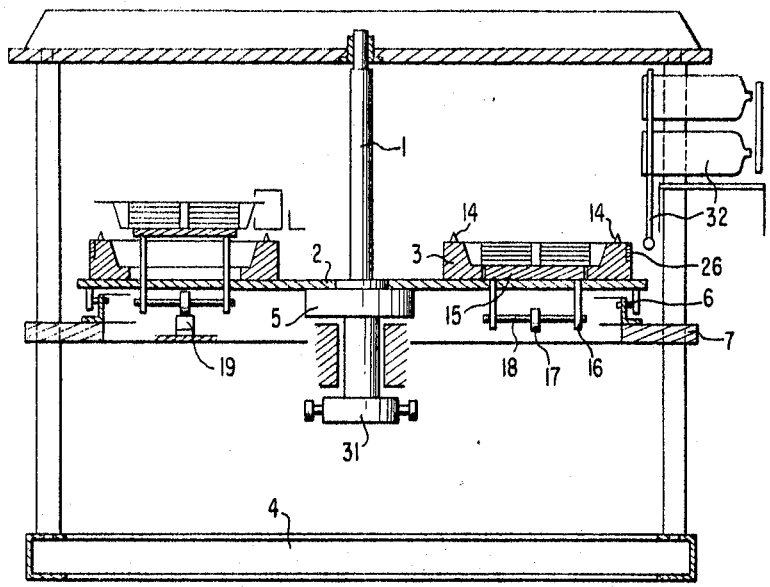

This invention relates to a process and apparatus for the manufacture of themo-shaped evacuated soft packages made from thin films.

In the manufacture of soft packages, the lower part of which is thermo-shaped, generally from a thin polyethylene-polyester film and/or some other film capable of being deep-drawn and which, after filling, is closed with a flat film made from the same material or some similar material which is vacuum-proof, with evacuation of the package, care must be taken to provide for exact guidance of the very thin and limp film at all parts of the machine in order to ensure trouble-free operation of the machine.

Known processes of this kind operate with a large number of molds, for example, 40 and more, which are attached to a conveyor chain. The film is held down at the edges of the individual molds, shaped while in web form and then cut, after the package has been fabricated. This process not only necessitates the use of highly complex apparatus, but it is a very complicated and time-consuming operation if the machine has to be changed over to produce packages of a different size. A change-over of this kind to the production of packages of different sizes is therefore uneconomical and has not been used hitherto in manufacturing operations. Furthermore, the fact that the film must be held down at the sides of the molds means that a relatively large excess of film must be used.

The present invention provides a process for the manufacture of evacuated packages in thin plastic film, wherein film in web form is conducted by a gripping device into a location over a mold at a staiton where it is thermo-shaped to form a container and the latter is severed from the web, the mold and resulting container are conveyed to another station where the container is filled, the mold and filled container are conveyed to a further station where film in web form is conducted by a gripping device into a location over the mold and filled container, sealed onto the container while leaving a gap for evacuation, severed from the web, evacuated through the gap and the gap sealed, the sealed package is removed from the mold and the mold is conveyed back to the first station referred to.

The invention also provides a machine for use in the foregoing process, the machine including a movable mold carrier, a reciprocatable gripping device for conducting film in web form over a mold at a first station of the carrier, reciprocatable mold cover and film-cutting means at the first station, heating means associated with the mold cover and means for establishing a pressure difference to form the film into a container in the mold, means at a second station of the carrier means for filling the container, a further reciprocatable gripping device at a third station of the carrier for conducting film in web form over the mold at the latter station, also at the latter station reciprocable mold cover and film-cutting means for sealing and evacuation as set forth, and the machine also including means for removal of the sealed package from the mold.

This process and apparatus can be considerably simplified compared with known apparatus.

Preferably, the mold is provided with means for anchoring film thereto and each gripping device has jaws permanently closed under spring loading and shaped to hold the film against tension only in the film supply direction and not in the retraction direction of the gripping device, so that, after conducting the film over the mold and anchoring it thereto, the gripper jaws can slide back over the film web while maintaining it under tension and in the fully retracted position are still in contact with the film web and are ready to advance it again in the supply direction. The anchoring means are advantageously constituted by pins at each end of the mold and the gripper jaws have recesses so arranged that when the film is over the mold the pins then at the forward end of the web can penetrate the recesses to hold the film against retraction of the jaws.

With such an arrangement, the wastage of film both between consecutive containers and consecutive closed packages is very much reduced. The film already may be perforated at the anchoring sites, or the perforation may be made by the pins during the process of anchoring. The commodity to be packaged at the filling station may, for example, be sliced sausage or sliced cheese.

The invention has the advantage that only very few molds are required, which greatly facilitates changing the machine over to the production of packages of a different size.

Thus, in one embodiment a rotary mold carrier has means for holding four molds at 90° intervals and four stations are provided in cruciform arrangement, three stations being as set forth and the forth station being a sealed package ejection station.

Figures 6, 7:
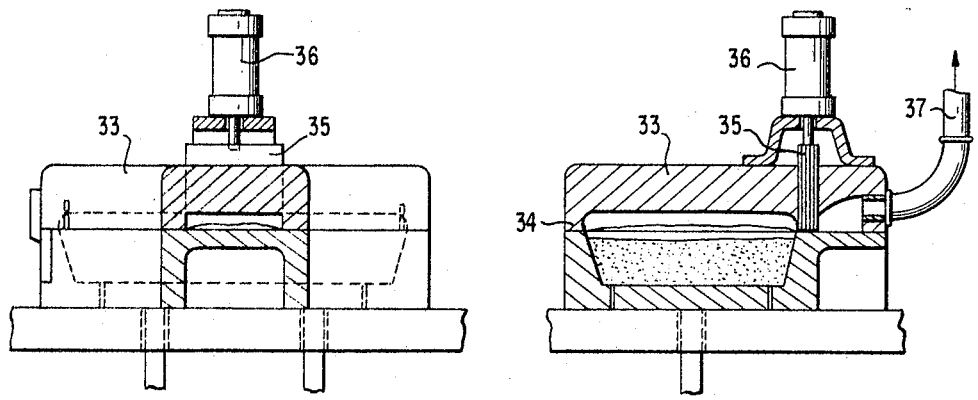

One embodiment of the apparatus of the invention is diagrammatically illustrated in the accompanying drawings in which:

FIGURE 1 is a plan view, being a section on the line E—F of FIGURE 2, including a turntable and showing machine stations I to IV, FIGURE 2 is a section on the line A—B of FIGURE 1, which passes through machine stations I and III, FIGURE 3 is a section on the line C—D of FIGURE 1, FIGURE 4 is a section through a mold secured to a carrier arm, FIGURE 5 is a plan view of the mold cover assembly of machine station III, FIGURE 6 is a section on the line G—H of FIGURE 5 showing the complete assembly, FIGURE 7 is a side elevation corresponding to FIGURE 6, and FIGURE 8 is a section through the jaws of a film gripper.

Referring to the drawings, FIGURE 1 shows a cruciform turntable or carrier 2 which rotates on a shaft 1; on the four arms thereof it carries molds 3 and it is set up in a mounting frame 4 (FIGURES 2 and 3). The carrier 2 is supported by a collar 5 on the shaft 1 and by the rollers 6 mounted on a track frame 7. At machine station I, a mold cover 8 is mounted in the frame 4 and can be lowered onto a mold 3 by means of a pneumatic or hydraulic cylinder 10. The mold cover is guided by the guide rods 9. An under recess 11 of the mold cover 8 is provided with infrared heating elements 12, for example infrared or quartz radiators, which heat the film to shaping temperature. Each mold 3 is in the form of a block which is provided with a recess 13 corresponding to the shape of the container to be fabricated. Pins 14 are situated on the margins of the mold 3 and serve to anchor to the mold 3 the film from which the contained is made, during the entire packaging process. The mold 3 is provided with an ejector device consisting of an ejector plate 15 which can be raised to the level of the upper margin of the mold 3 by means of the guide rods 16. The guide rods 16 are connected at their lower ends by an axle 18 carrying a wheel 17 and being raised when the latter passes over a cam surface 19, thus raising the ejector plate.

Each mold 3 is secured to an arm of the carrier 2 by means of angle strips 20, which facilitate interchanging of the molds. A film web from which the container is to be shaped at station I, is located over the mold 3 by a movable gripper 21, lowered onto the mold and thus anchored on pins 14. Anchoring is effected when the gripper is lowered over the mold so that the pins 14 pierce the film in semicircular recesses 22 of the gripper. Gripper jaws 23 and 24 are pressed together by a constant spring pressure. The jaws 23 and 24 are so shaped that the film is firmly held in the film supply direction of the gripper only, whereas when the gripper is retracted, it is possible for the film to slip between the jaws. By this means the film is kept under constant tension during its location on the mold. As soon as the jaws of the gripper 21 are clear of the mold, the mold cover 8 is lowered, in which process the film is cut from its web between a movable knife 25 mounted on the mold cover and a fixed knife edge 26 mounted on the mold 3 and becomes anchored on further pins 14 at the knife end of the mold 3. The film, which is now disposed between the mold cover 8 and the mold 3, is heated to the shaping temperature by the heater 12 and shaped by the application of pressure or vacuum. The to and fro movement of the film gripper is controlled by a mechanism 27. A spring roller 28 is disposed between a film web stock roll 29 and the gripper to ensure that the film runs off smoothly. When shaping is finished, the mold cover is raised and the carrier 2 is turned through 90°, thus moving all the molds to their next stations. This pivoting movement is effected by means of a mechanism comprising a trip cam 30 and a star wheel 31 which is fixed on the shaft 1. This mechanism could be replaced by some other mechanism, for example, a Maltese cross drive. At station II is located a cutting and charging device 32, by means of which the container now disposed in the mold 3 is filled. After the filling operation, the carrier 2 is again turned through 90°, thus moving the filled container to station III. Here a film locating device similar to the one used at station I is used to place film which is to cover the container, again in the form of a web, over the mold and to secure it on the corresponding pins 14. At this station also, the covering film is severed from its film web by lowering the mold cover 33 on which a knife 40 is mounted. A margin 34 of the mold cover 33 is designed to function as a welding surface, a gap being left in the margin at one side of the package so that the latter is left open at that point. This opening allows the package to be evacuated and, after evacuation, it is closed by a slide 35 also acting as a welding means. The slide 35 is actuated by a pneumatic or hydraulic cylinder 36. Evacuation of the package is effected via a pipe 37. When sealing of the package is complete, the mold cover 33 is raised and the carrier is again turned through 90° to station IV. During this movement, the roller 17 travels over the cam 19 and raises the ejector plate 15 to the level of the upper edge of the mold. The package is thereby lifted off of the pins and the mold 3 is then returned to station I by a further movement of the carrier 2, during which process the package is pushed off of the raised ejector plate 15 to a chute 39 by a cam 38. The mold 3 then can commence the cycle again.

It will be obvious to those skilled in the art that many modifications may be made within the scope of the present invention without departing from the spirit thereof, and the invention includes all such modifications.

What is claimed is:

1. An apparatus for preparing evacuated plastic packages which comprises a movable mold carrier; means for conducting a film over a mold at a first station of the carrier, the latter station including film-cutting means and means to form the film into a container in the mold; means for moving the container to a second station the latter including means for filling the container; means for moving the filled container to a third station the latter including means for conducting a film over the container, means for cutting the film, means for sealing the film to the container, and means for evacuating the package so formed; and means for removing a completely sealed package from the mold.

2. An apparatus according to claim 1 in which the means for conducting a film over the mold and the means for conducting a film over the container each includes gripper means having jaws shaped to hold the film against tension only in the film supply direction.

3. An apparatus according to claim 1 in which the mold has means thereon for anchoring the film thereto.

4. An apparatus according to claim 1 in which the means to form the film into a container in the mold includes a vertically reciprocatable mold cover having heating means therein.

5. An apparatus according to claim 1 in which the means for sealing the film to the container includes a vertically reciprocatable mold cover having a sealing rim thereon.

6. An apparatus according to claim 1 in which the mold carrier is circular and has means for holding four molds spaced 90° apart.

7. An apparatus according to claim 1 in which the means for sealing the film to the container leaves a small unsealed gap which after evacuation of the package, is sealed by an additional sealing means.

8. An apparatus according to claim 4 in which the film cutting means includes knife means mounted on the mold cover.

9. An apparatus according to claim 5 in which the means for cutting the film includes knife means mounted on the mold cover.

References Cited

UNITED STATES PATENTS

| 3,020,686 | 2/1962 | Rueckert et al. | 53—112 X |
| 3,061,984 | 11/1962 | Mahaffy | 53—112 X |
| 3,283,469 | 11/1966 | McBrady et al. | 53—112 X |
| 3,340,668 | 9/1967 | Bofinger | 53—22 |

TRAVIS S. McGEHEE, Primary Examiner